US000001026H

United States Statutory Invention Registration [19]

[11] Reg. Number: H1026

Maronde et al.

[43] Published: Mar. 3, 1992

[54] ROTARY BULK SOLIDS DIVIDER

[75] Inventors: Carl P. Maronde, McMurray; Richard P. Killmeyer, Jr., Pittsburgh, both of Pa.

[73] Assignee: The United States of America as represented by the United States Department of Energy, Washington, D.C.

[21] Appl. No.: 618,802

[22] Filed: Nov. 28, 1990

[51] Int. Cl.[5] ..... B65B 1/10

[52] U.S. Cl. ..... 141/242; 141/250; 141/284

*Primary Examiner*—Michael J. Carone
*Attorney, Agent, or Firm*—Thomas G. Anderson; William R. Moser; Richard E. Constant

[57] ABSTRACT

An apparatus for the disbursement of a bulk solid sample comprising, a gravity hopper having a top open end and a bottom discharge end, a feeder positioned beneath the gravity hopper so as to receive a bulk solid sample flowing from the bottom discharge end, and a conveyor receiving the bulk solid sample from the feeder and rotating on an axis that allows the bulk solid sample to disperse the sample to a collection station.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROTARY BULK SOLIDS DIVIDER

CONTRACTUAL ORIGIN OF THE INVENTION

The U.S. Government has rights in this invention pursuant to the employee/employer relationship of the inventor to the U.S. Department of Energy at the Pittsburgh Energy Technology Center.

BACKGROUND OF THE INVENTION

The present invention relates generally to an apparatus for the random division and sampling of granular or powder bulk solids, and more particularly to an apparatus for the random representative division and sampling of a large quantity of a bulk solid.

In conducting research on coal and other bulk solids it is important to use representative samples having identical properties. Prior to the present invention the division or splitting of large quantities of bulk solids was done by hand and required an extensive amount of manpower. Commercial rifflers for laboratory use were either unable to provide the capacity required for dividing large quantities of bulk solids, could not provide the appropriate number of representative samples, or could not handle a wide range of particle sizes.

It is therefore an object of the invention to provide a quick and consistent means to divide bulk solids of various particle sizes and quantities into a number of representative samples.

It is another object of the invention to provide a means to collect representative samples of a bulk solid of varying particle sizes and quantities.

Additional objects, advantages and novel features of the invention will be set forth in part in the description which follows, and in part will become apparent to those skilled in the art upon examination of the following or may be learned by practice of the invention.

SUMMARY OF THE INVENTION

The invention comprises a gravity hopper suspended above a feeder. The feeder acts as a means of conveyance to provide a constant feed of the bulk solid to a rotary distribution apparatus. The feeder itself can be either a stationary member placed on an incline allowing free flow of the particles or a vibrating plate which can shake the particles from one another. The individual samples then flow from the feeder to a rotating distribution apparatus. A conveyor or chute is attached to a platform which is connected to a motor that rotates the platform and conveyor/chute in a clockwise or counterclockwise direction. This rotation allows the particles to be randomly and sequentially distributed into the collection receptacles positioned underneath.

BRIEF DESCRIPTION OF THE DRAWINGS

The accompanying drawings, which are incorporated in and form part of the specification, illustrate embodiments of the present invention and together with the description, serve to explain the principles of the invention. In the drawings.

DETAILED DESCRIPTION OF THE INVENTION

Figure 1:
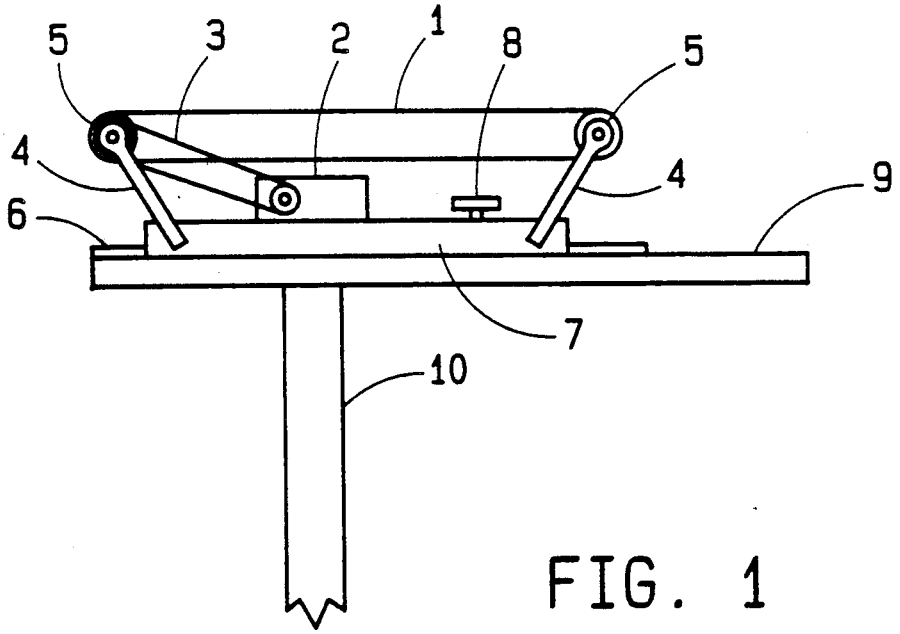
FIG. 1 shows a side view of the distribution apparatus of the first embodiment of the invention.
Figure 2:
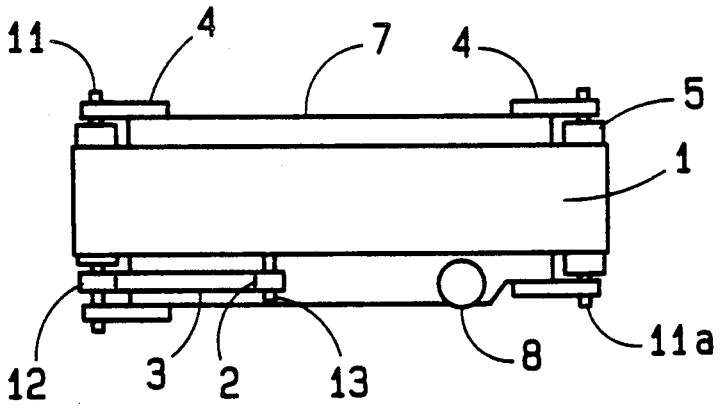
FIG. 2 shows a top view of the distribution apparatus of the embodiment shown in FIG. 1.

Referring to FIGS. 1 and 2, a conveyor 1 is attached to a platform 9 by a lockdown screw 8. The conveyor operates at a variable speed by a motor 2 connected to the conveyor 1 by a belt 3. The conveyor includes supports 4 connected to a moveable conveyor positioning plate 7. This allows the conveyor to be placed in a varying location along its longitudinal axis whereby the effective radius of discharge of the conveyor can be varied for the distribution of the particles into a fewer or greater number of receptacles. The positioning plate 7 is held into position by positioning plate guides 6. The supports 4 are attached to the conveyor at conveyor shafts 11 and **11*a*. The shafts 11 and 11*a* include a bearing assembly 5 which allows minimal resistance and friction as the shaft rotates. The variable speed motor has a shaft 13 connected to the conveyor by a belt 3 and pulley 12**.

Figure 3:
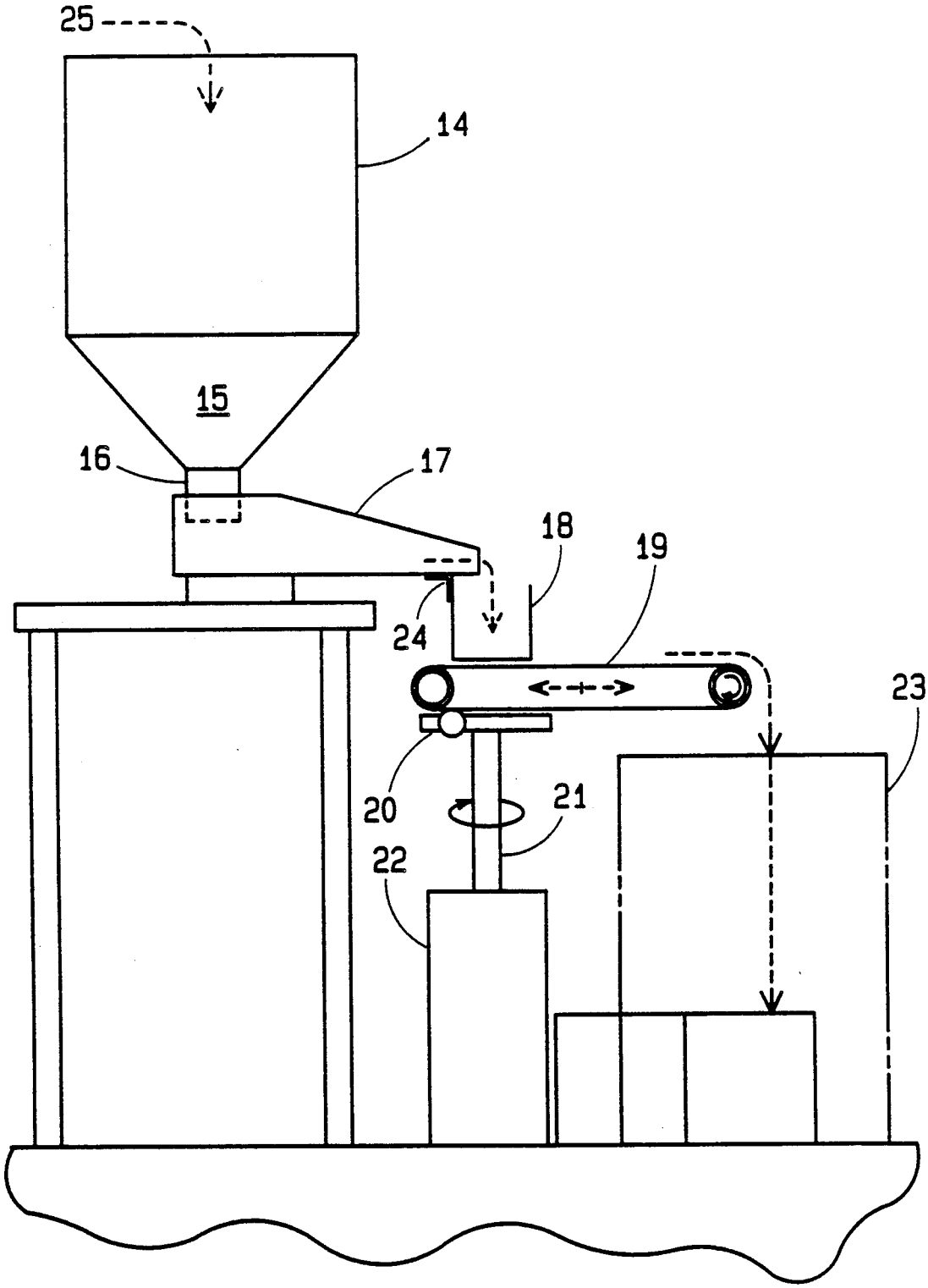
FIG. 3 shows the first embodiment of the invention.

Referring to FIG. 3, in operation a gravity hopper 14 having two open ends is suspended above a feeder 17. The hopper containing the bulk solid sample comprising a gradually decreasing circumference 15 at one end that terminates at a restricting orifice 16. This restricting orifice is designed so that the particles of the bulk solid entering the gravity hopper at position 25 will have a constant flow pattern as they exits through the orifice 16. Feeder 17 receives the bulk solid sample from the hopper 14 and allows proper separation of the bulk solid samples and for the constant flow of the particles to the distribution apparatus. A chute 18 is attached by a bracket 24 to prevent the scattering of the samples as they leave the feeder 17. The samples then fall to a conveyor 19 attached to a rotating platform 20. As the samples fall on the conveyor the rotation of the platform and conveyor belt allows for an even distribution of the bulk solid particles into the collection receptacles 23. The platform 20 is attached to a rotating shaft 21 which is powered by a motor 22.

Figure 4:
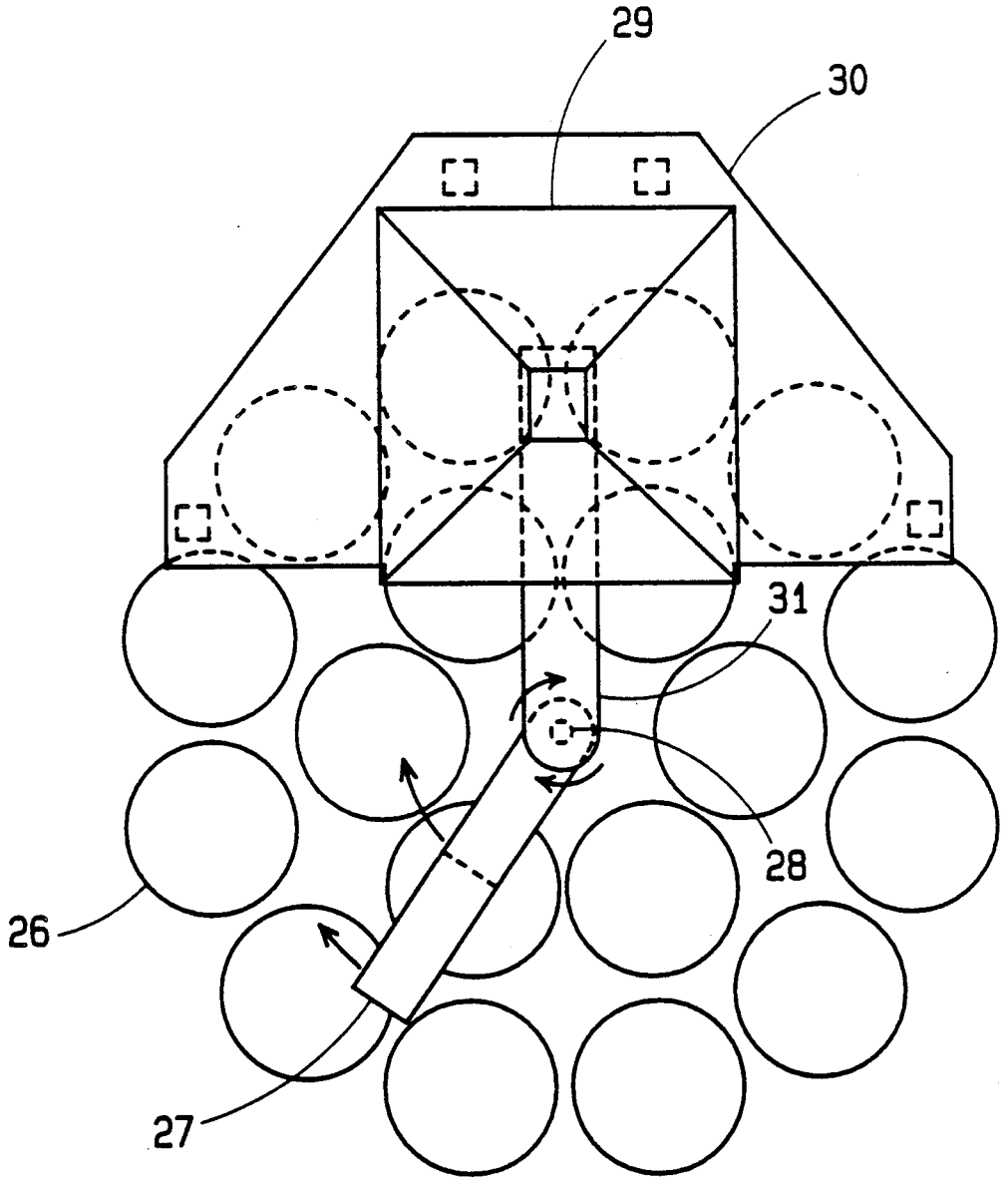
FIG. 4 shows a top view of the second embodiment of the invention including the collection receptacles.
Figure 5:
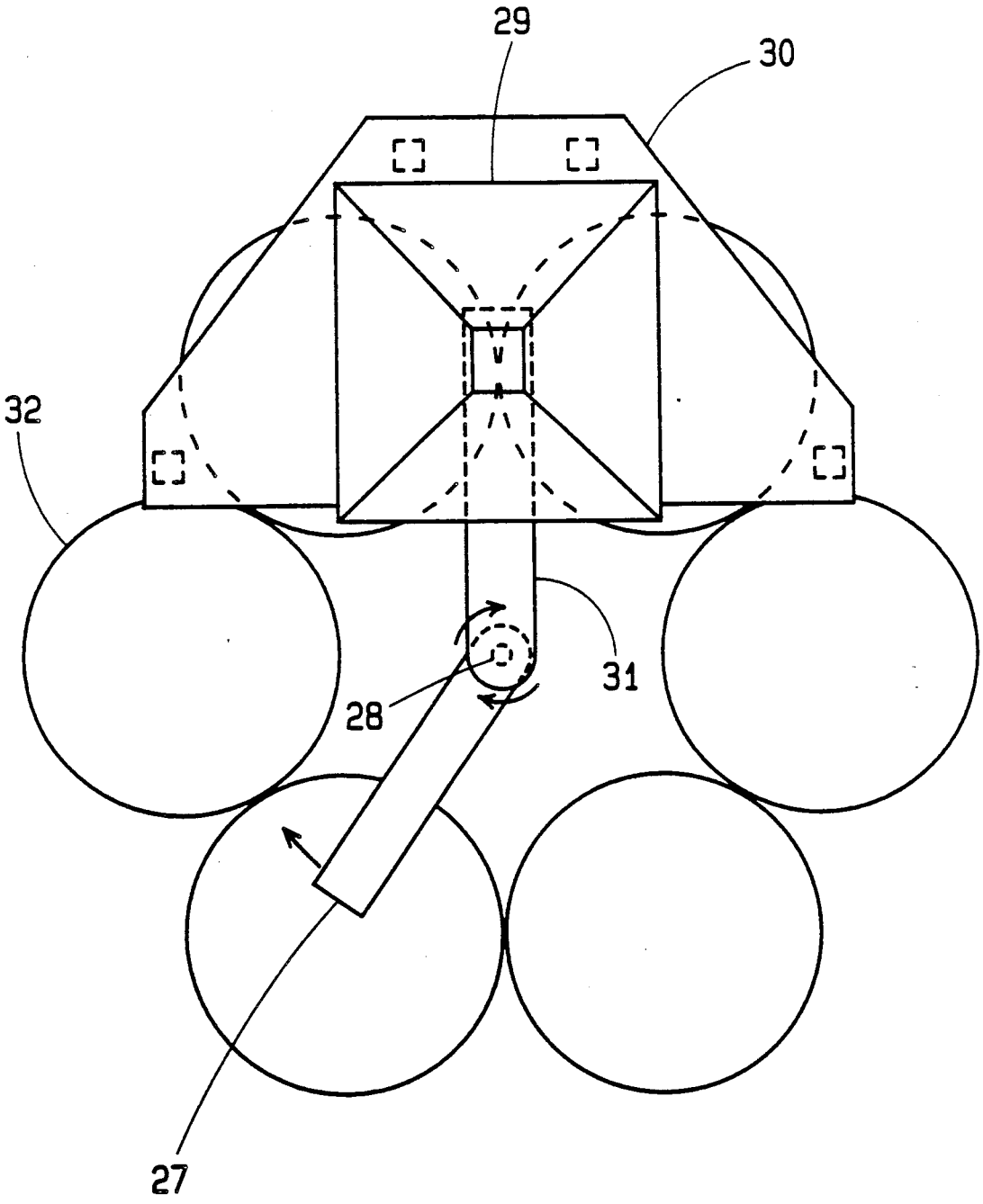
FIG. 5 shows a top view of the second embodiment of the invention having a larger set of collection receptacles.

FIGS. 4 and 5 are a top view of another embodiment of the invention showing collection receptacles 26 and 32 in various sizes and positions. Also shown is the rotating conveyor 27 which is being turned in a clockwise direction by a shaft 28. The hopper 29 its support platform 30 and the feeder 31 are included.

Figure 6:
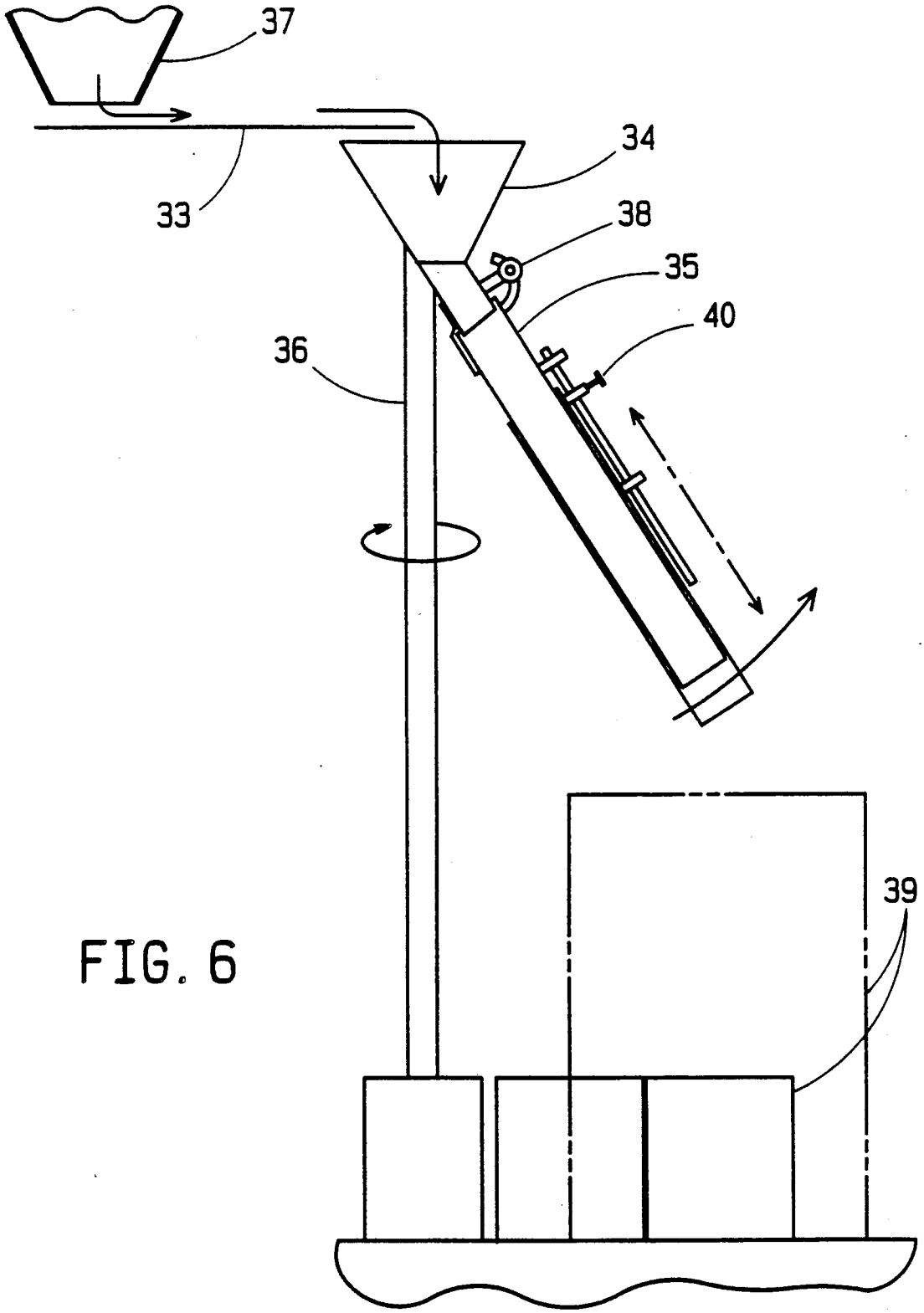
FIG. 6 shows the third embodiment of the invention.

FIG. 6 is a different embodiment of the invention. The bulk solid sample particles exit the gravity hopper 37 onto the feeder 33. The detached chute 34 receives the particles from the feeder 33. A connecting conveyor 35 is attached to the chute 34. The conveyor 35 is adjustable so that the angle of the conveyor can be changed by pivoting the conveyor 35 with the positioning screw 38. The conveyor 35 also allows adjustment along its longitudinal axis by adjustment assembly 40. Both the chute 34 an conveyor 35 are connected to a rotating shaft which provides clockwise or counterclockwise rotation. Collection receptacles 39 are positioned to receive the samples as they fall from the conveyor 35.

The foregoing description of the preferred embodiments of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. An apparatus for the division of a bulk solid sample comprising:

a gravity hopper means having two open ends and wherein one of said open ends forms a bottom discharge opening accommodating the flow of bulk solid sample from said gravity hopper means;

a feeder means positioned so as to receive and commingle said bulk solid sample as it flows through said bottom discharge opening; and a distribution means positioned so as to receive said bulk solid sample from said feeder means and wherein said distribution means has the ability to rotate while transporting said bulk solid sample to a collection station.

2. An apparatus for the division of a bulk solid sample, as recited in claim 1 wherein:

said feeder means includes a vibrating feeder.

3. An apparatus for the division of a bulk solid sample, as recited in claim 2 wherein:

said distribution means includes a belt conveyor having the ability to be adjustable along a horizontal length.

4. An apparatus for the division of a bulk solid sample, as recited in claim 3 wherein:

said collection station includes a plurality of collection receptacles selectively positionable so as to receive said bulk solid sample from said belt conveyor.

5. An apparatus for the division of a bulk solid sample, as recited in claim 3 wherein:

said feeder means comprises four sides with three vertically extending sides and whereby said fourth side is adapted to allow said bulk solid sample to flow freely, and a hollow cylindrical member having unobstructed ends fixedly attached to said fourth side in a receiving position to receive said bulk solid sample from said feeder means.

6. An apparatus for the division of a bulk solid sample, as recited in claim 2 wherein:

said distribution means includes a conveyor having the ability to be adjustable along its horizontal length and having the ability to pivot about its horizontal axis.

* * * * *